US009037465B2

(12) United States Patent
Melamed et al.

(10) Patent No.: US 9,037,465 B2
(45) Date of Patent: *May 19, 2015

(54) AUTOMATIC DISCLOSURE DETECTION (71) Applicant: AT&T Intellectual Property I, L.P., Atlanta, GA (US)

(72) Inventors: I. Dan Melamed, New York, NY (US); Andrej Ljolje, Morris Plains, NJ (US); Bernard Renger, New Providence, NJ (US); Yeon-Jun Kim, Whippany, NJ (US); David J. Smith, Milington, NJ (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 129 days.

This patent is subject to a terminal disclaimer.

(21) Appl. No.: 13/772,509

(22) Filed: Feb. 21, 2013

(65) Prior Publication Data

US 2013/0166293 A1     Jun. 27, 2013

Related U.S. Application Data (63) Continuation of application No. 12/490,631, filed on Jun. 24, 2009, now Pat. No. 8,412,527.

(51) Int. Cl.
G10L 15/18 (2013.01)
G06F 17/28 (2006.01)
G10L 15/04 (2013.01)
G10L 15/26 (2006.01)

(52) U.S. Cl.
CPC ............ *G06F 17/2881* (2013.01); *G10L 15/04* (2013.01); *G10L 15/26* (2013.01); *Y10S 707/99935* (2013.01)

(58) Field of Classification Search
CPC ...... G10L 15/04; G10L 15/26; G06F 17/2881
USPC ............. 704/270, 275, 270.1, 257, 256, 255, 704/251, 246, 236; 379/88.01, 88.02, 379/88.03; 707/999.005; 705/26, 81; 455/49, 563; 700/94
See application file for complete search history.

(56) References Cited

U.S. PATENT DOCUMENTS

| 5,872,775 | A  | * | 2/1999  | Saints et al.  | 370/342  |
|-----------|----|---|---------|----------------|----------|
| 6,098,045 | A  | * | 8/2000  | Yokomizo et al.| 704/500  |
| 7,133,837 | B1 | * | 11/2006 | Barnes, Jr.    | 705/26.81|
| 7,668,718 | B2 | * | 2/2010  | Kahn et al.    | 704/270  |
| 7,725,360 | B2 | * | 5/2010  | Barnes, Jr.    | 705/27.1 |
| 7,783,028 | B2 |   | 8/2010  | Bantz et al.   |          |
| 8,412,527 | B2 |   | 4/2013  | Ljolje et al.  |          |
| 2003/0115064 | A1 | * | 6/2003 | Gusler et al. | 704/270 |
| 2005/0010411 | A1 | * | 1/2005 | Rigazio et al.| 704/246 |
| 2006/0195321 | A1 | * | 8/2006 | Deligne et al.| 704/257 |
| 2006/0206306 | A1 | * | 9/2006 | Cao et al.    | 704/4   |
| 2006/0223042 | A1 | * | 10/2006 | Epler et al. | 434/323 |
| 2007/0061845 | A1 | * | 3/2007 | Barnes, Jr.   | 725/62  |

(Continued)

*Primary Examiner* — Vijay B Chawan
(74) *Attorney, Agent, or Firm* — Greenblum & Bernstein, P.L.C.

(57) ABSTRACT

A method of detecting pre-determined phrases to determine compliance quality is provided. The method includes determining whether at least one of an event or a precursor event has occurred based on a comparison between pre-determined phrases and a communication between a sender and a recipient in a communications network, and rating the recipient based on the presence of the pre-determined phrases associated with the event or the presence of the pre-determined phrases associated with the precursor event in the communication.

20 Claims, 9 Drawing Sheets

(56) References Cited

U.S. PATENT DOCUMENTS

| | | | |
|---|---|---|---|
| 2007/0071206 A1* | 3/2007 | Gainsboro et al. | 379/168 |
| 2009/0209291 A1* | 8/2009 | Ramprasad et al. | 455/564 |
| 2010/0161315 A1 | 6/2010 | Melamed et al. | |
| 2010/0332286 A1 | 12/2010 | Melamed et al. | |

* cited by examiner

AUTOMATIC DISCLOSURE DETECTION

CROSS-REFERENCE TO RELATED APPLICATIONS

The present application is a continuation of pending U.S. patent application Ser. No. 12/490,631, filed on Jun. 24, 2009, the disclosures of which are expressly incorporated by reference herein in their entireties.

BACKGROUND

1. Field of the Disclosure

The present disclosure relates to the field of communication networks. More particularly, the present disclosure relates to analyzing a communication between a caller and an agent to determine compliance quality of the agent in a communications network.

2. Background Information

Typically, when a customer is interested in purchasing a product and/or subscribing to a service provided by a communications network, the customer calls a customer service call center to speak with a customer service agent to inquire about and/or obtain the desired product and/or service. Customer service agents are instructed and trained to follow certain guidelines when communicating with the customers, including being required to communicate mandated disclosure statements in certain communications. For example, a customer service agent may be required to recite certain disclaimer language when an offer for sale is made or when a sales transaction is finalized.

DETAILED DESCRIPTION

In view of the foregoing, the present disclosure, through one or more of its various aspects, embodiments and/or specific features or sub-components, is thus intended to bring out one or more of the advantages as specifically noted below.

According to an aspect of the present disclosure, a method of detecting pre-determined phrases to determine compliance quality includes specifying and storing a plurality of pre-determined phrases in association with an event and a precursor event, receiving audible input from at least a sender and a recipient in a communication over a communications network, specifying, recording and storing account data from the sender based on the communication, and determining whether the event has occurred based on the communication. When the event has occurred, the method includes determining whether at least one of the plurality of pre-determined phrases associated with the event is present in the received audible input. When the event has not occurred, the method includes determining whether a trigger phrase associated with the precursor event is present in the received audible input. When the trigger phrase associated with the precursor event is present, the method includes determining whether at least one of the plurality of pre-determined phrases associated with the precursor event is present in the received audible input. The method also includes rating the recipient based on the presence of the pre-determined phrases associated with the event or the presence of the pre-determined phrases associated with the precursor event in the communication.

According to another aspect of the present disclosure, when the event has occurred, the determining whether at least one of the plurality of pre-determined phrases associated with the event is present in the received audible input further includes selecting at least one of the plurality of pre-determined phrases associated with the event, comparing the selected pre-determined phrases with a transcript of the received audible input, and determining whether the selected pre-determined phrases are present in the transcript.

According to yet another aspect of the present disclosure, when the event has not occurred and the trigger phrase associated with the precursor event is present, the determining whether at least one of the plurality of pre-determined phrases associated with the precursor event is present in the received audible input further includes selecting at least one of the plurality of pre-determined phrases associated with the precursor event, comparing the selected pre-determined phrases with a transcript of the received audible input, and determining whether the selected pre-determined phrases are present in the transcript.

According to still another aspect of the present disclosure, the method includes determining whether the transcript includes word strings matching the selected pre-determined phrases, and computing a compliance quality score based on the determined word string matches between the transcript and the selected pre-determined phrases associated with the event.

According to an aspect of the present disclosure, the method includes determining whether the transcript includes word strings matching the selected pre-determined phrases, and computing a compliance quality score based on the determined word string matches between the transcript and the selected pre-determined phrases associated with the precursor event.

According to another aspect of the present disclosure, the method includes comparing the computed compliance quality score to a pre-determined threshold, wherein when the computed compliance quality score exceeds the pre-determined threshold, outputting a positive compliance quality score, and wherein when the computed score fails to meet the pre-determined threshold, outputting a negative compliance quality score.

According to yet another aspect of the present disclosure, the method includes displaying the outputted compliance quality score to determine at least one of regulatory compliance, marketing compliance, public relations compliance, training quality compliance, and corporate mandated compliance of the recipient during the communication.

According to still another aspect of the present disclosure, the method includes collecting a plurality of outputted compliance quality scores from a plurality of received communications including the recipient, and averaging the collected plurality of outputted compliance scores to identify compliance quality of the recipient for improving compliance quality within the communications network.

According to an aspect of the present disclosure, the event is a sales transaction, and the precursor event is an offer for sale.

According to another aspect of the present disclosure, the sender account data includes information about at least one of a time, a date, an area code, a call duration, a geographic location, a network designation, an agent, a product, a sales transaction, and an account balance.

According to an aspect of the present disclosure, a system to detect pre-determined phrases for determining compliance quality includes a receiver that receives audible input from a sender and a recipient in a communication over a communications network, a transcriber that communicates with the receiver to transcribe the audible input into a transcript, an account data processor that collects and records account data from at least the sender, a pre-determined phrase database that includes a plurality of pre-determined phrases associated with an event and a precursor event, a pre-determined phrase selector that communicates with the pre-determined phrase database and at least one of the transcriber and the account data processor to select at least one of the plurality of pre-determined phrases from the pre-determined phrase database, a comparator that communicates with the transcriber and the pre-determined phrase selector to compute a compliance quality score based on the transcript and the at least one selected pre-determined phrase and an outputter to display results of the computed compliance quality score.

According to another aspect of the present disclosure, the pre-determined phrase selector is configured to determine whether at least one of the event and the precursor event has occurred, wherein when the event has occurred, the pre-determined phrase selector communicates with the account data processor and the pre-determined phrase database to select at least one of the pre-determined phrases associated with the event, and wherein when the event has not occurred and the precursor event has occurred, the pre-determined phrase selector communicates with the transcriber to identify a trigger phrase associated with the precursor event, and when the trigger phrase associated with the precursor event is present in the transcript, the pre-determined phrase selector communicates with the pre-determined phrase database to select at least one of the pre-determined phrases associated with the precursor event.

According to yet another aspect of the present disclosure, the comparator is configured to compare word string matches between the transcript and the selected at least one of the plurality of pre-determined phrases, and to compute the compliance quality score based on the determined word string matches between the transcript and the selected pre-determined phrases associated with the occurrence of at least one of the event and the precursor event.

According to still another aspect of the present disclosure, the outputter is configured to display at least one of a positive compliance quality score and a negative compliance quality score to determine at least one of regulatory compliance, marketing compliance, public relations compliance, training quality compliance, and corporate mandated compliance of the recipient during the communication.

According to an aspect of the present disclosure, a tangible computer readable storage medium including a computer program for processing input variables in a system for detecting pre-determined phrases to determine compliance quality includes a receiving code segment, recorded on the tangible computer readable storage medium, executable to receive audible input from a communication between a sender and a recipient in a communications network and to transcribe the audible input into a transcript, a collecting code segment, recorded on the tangible computer readable storage medium, executable to collect and record account data from at least the sender, a storing code segment, recorded on the tangible computer readable storage medium, executable to receive and store a plurality of pre-determined phrases associated with at least one of an event and a precursor event, a selecting code segment, recorded on the tangible computer readable storage medium, executable to select at least one of the plurality of pre-determined phrases based on at least one of the account data and the transcript, a computing code segment, recorded on the tangible computer readable storage medium, executable to compute a compliance quality score based on word string matches between the selected at least one of the plurality of pre-determined phrases and the transcript, and an output code segment, recorded on the tangible computer readable storage medium, executable to display results of the computed compliance quality score.

According to another aspect of the present disclosure, the selecting code segment is further executable to determine whether at least one of the event and the precursor event has occurred, wherein when the event has occurred, the selecting code segment is executable to communicate with the collecting code segment and the storing code segment, and is further executable to select at least one of the pre-determined phrases associated with the event from the storing code segment, and wherein when the event has not occurred and the precursor event has occurred, the selecting code segment is executable to communicate with the receiving code segment, and is further executable to identify a trigger phrase associated with the precursor event from the transcript, and when the trigger phrase associated with the precursor event is present in the transcript, the selector code segment is executable to communicate with the storing code segment, and is further executable to select at least one of the pre-determined phrases associated with the precursor event from the storing code segment.

According to yet another aspect of the present disclosure the computing code segment is further executable to compare the word string matches between the transcript and the selected at least one of the plurality of pre-determined phrases and to compute the compliance quality score based on the determined word string matches between the transcript and the selected pre-determined phrases associated with the occurrence of at least one of the event and the precursor event.

Figure 1:
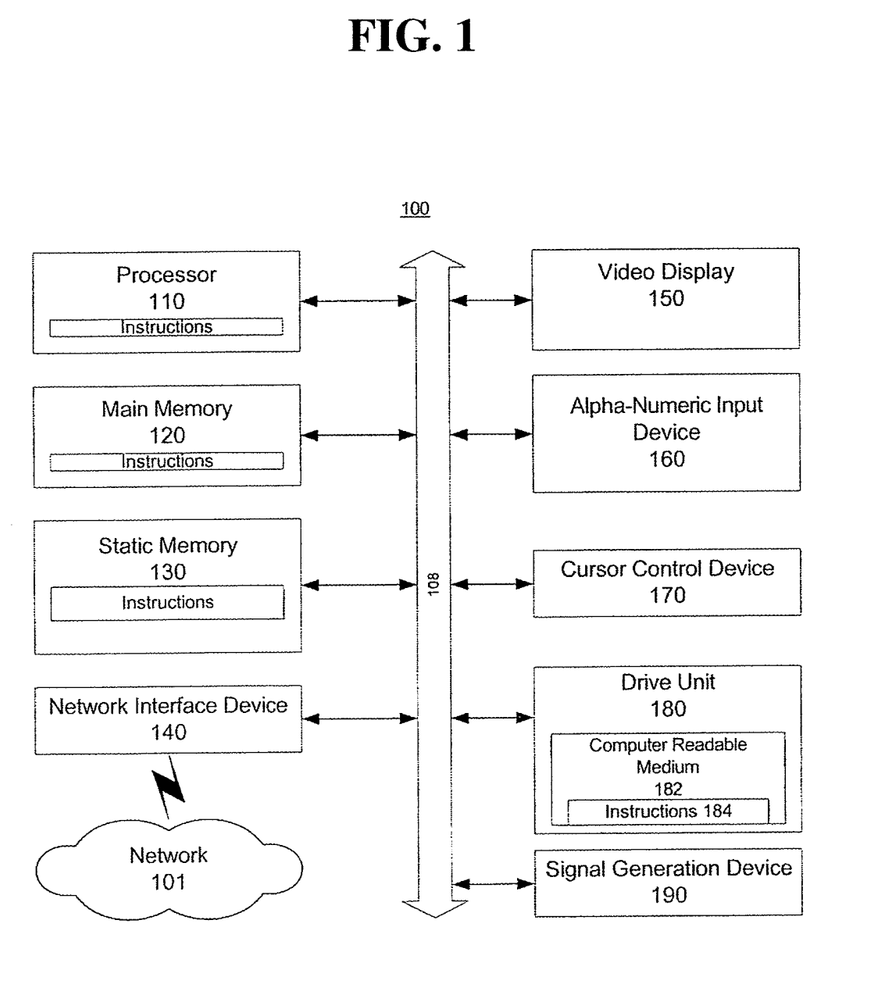
FIG. 1 shows an exemplary general computer system that includes a set of instructions for detecting pre-determined phrases for determining compliance quality in a communications network.

FIG. 1 is an illustrative embodiment of a general computer system, on which a method of detecting pre-determined phrases to determine compliance quality can be implemented, which is shown and is designated 100. The computer system 100 can include a set of instructions that can be executed to cause the computer system 100 to perform any one or more of the methods or computer based functions disclosed herein. The computer system 100 may operate as a standalone device or may be connected, for example, using a network 101, to other computer systems or peripheral devices.

In a networked deployment, the computer system may operate in the capacity of a server or as a client user computer in a server-client user network environment, or as a peer computer system in a peer-to-peer (or distributed) network environment. The computer system 100 can also be implemented as or incorporated into various devices, such as a personal computer (PC), a tablet PC, a set-top box (STB), a personal digital assistant (PDA), a mobile device, a global positioning satellite (GPS) device, a palmtop computer, a laptop computer, a desktop computer, a communications device, a wireless telephone, a land-line telephone, a control system, a camera, a scanner, a facsimile machine, a printer, a pager, a personal trusted device, a web appliance, a network router, switch or bridge, or any other machine capable of executing a set of instructions (sequential or otherwise) that specify actions to be taken by that machine. In a particular embodiment, the computer system 100 can be implemented using electronic devices that provide voice, video or data communication. Further, while a single computer system 100 is illustrated, the term "system" shall also be taken to include any collection of systems or sub-systems that individually or jointly execute a set, or multiple sets, of instructions to perform one or more computer functions.

As illustrated in FIG. 1, the computer system 100 may include a processor 110, for example, a central processing unit (CPU), a graphics processing unit (GPU), or both. Moreover, the computer system 100 can include a main memory 120 and a static memory 130 that can communicate with each other via a bus 108. As shown, the computer system 100 may further include a video display unit 150, such as a liquid crystal display (LCD), an organic light emitting diode (OLED), a flat panel display, a solid state display, or a cathode ray tube (CRT). Additionally, the computer system 100 may include an input device 160, such as a keyboard, and a cursor control device 170, such as a mouse. The computer system 100 can also include a disk drive unit 180, a signal generation device 190, such as a speaker or remote control, and a network interface device 140.

In a particular embodiment, as depicted in FIG. 1, the disk drive unit 180 may include a computer-readable medium 182 in which one or more sets of instructions 184, e.g. software, can be embedded. A computer-readable medium 182 is a tangible article of manufacture, from which sets of instructions 184 can be read. Further, the instructions 184 may embody one or more of the methods or logic as described herein. In a particular embodiment, the instructions 184 may reside completely, or at least partially, within the main memory 120, the static memory 130, and/or within the processor 110 during execution by the computer system 100. The main memory 120 and the processor 110 also may include computer-readable media.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

The present disclosure contemplates a computer-readable medium 182 that includes instructions 184 or receives and executes instructions 184 responsive to a propagated signal, so that a device connected to a network 101 can communicate voice, video or data over the network 101. Further, the instructions 184 may be transmitted or received over the network 101 via the network interface device 140.

Figure 2:
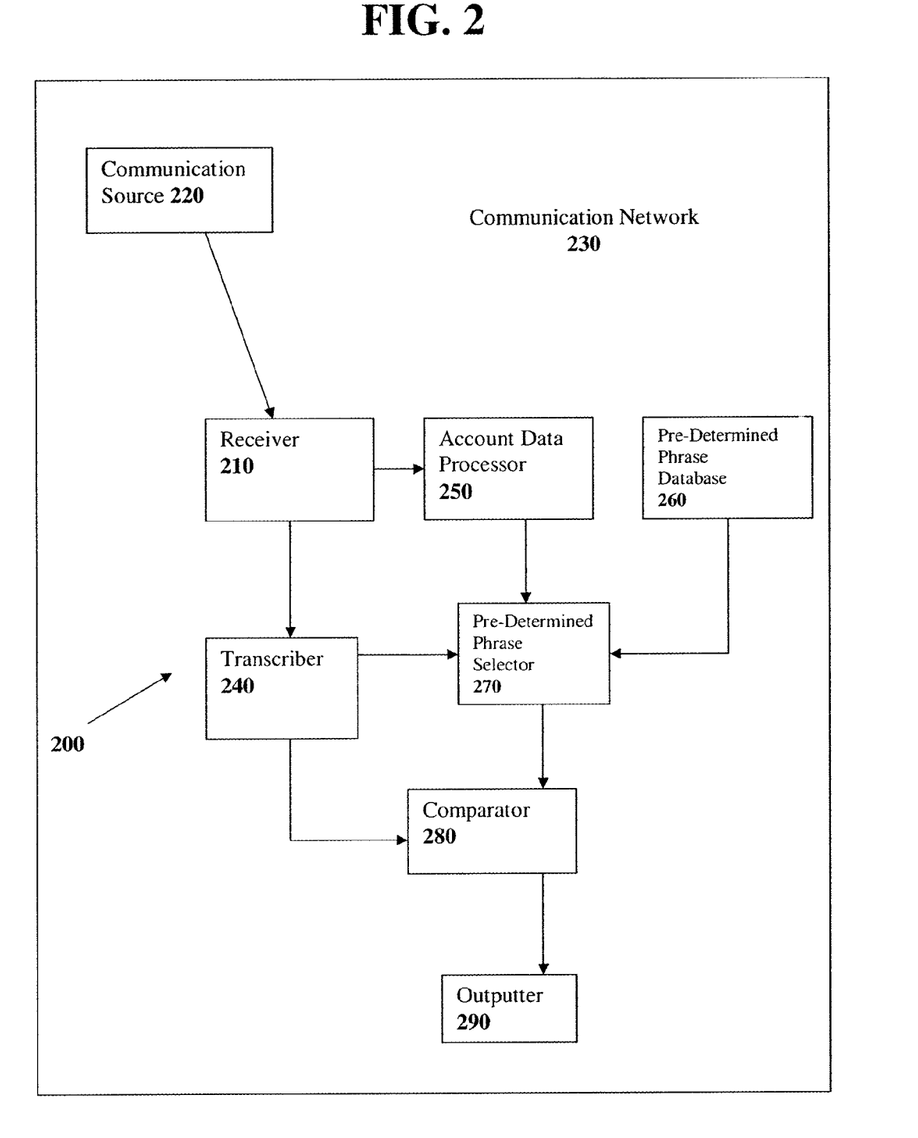
FIG. 2 illustrates an exemplary system to detect pre-determined phrases for determining compliance quality, according to an aspect of the present disclosure.

FIG. 2 illustrates an exemplary system 200 to detect pre-determined phrases for determining compliance quality, according to an aspect of the present disclosure. The system 200 includes a receiver 210 that receives audible input from a sender and a recipient in a communication 220 over a communications network 230, and a transcriber 240 that communicates with the receiver 210 to transcribe the audible input into a transcript. For example, a customer in the communications network 230 may call a customer service call center to speak with a customer service agent about a product or a service. When the call is received, the receiver 210 communicates with the transcriber 240 in real-time to continuously output a transcript of the ongoing conversation. In other contemplated non-limiting embodiments of the present disclosure, the transcriber 240 may record and store the audible input between the customer and the customer service agent to be transcribed at a time after the conversation is completed. In further embodiments, the transcriber may be configured as a recorder to record and store the audible input as one or more audio files.

The system 200 also includes an account data processor 250 and a pre-determined phrase database 260. The account data processor 250 collects and records account data from at least the sender via the receiver 210. The collected account data may include information about at least one of a time of the call, a date of the call, an area code of the customer, a call duration of the conversation between the customer and the customer service agent, a geographic location of the customer, a network designation of the customer's phone, an agent, a product, a sales transaction, and an account balance. The information collected is customizable to fit the needs of a user, and the collected information may be utilized in a variety of ways including, but not limited to, determining whether an event has occurred based on the presence of or a change in one of the above-mentioned categories of collected information.

The pre-determined phrase database 260 includes a plurality of pre-determined phrases associated with an event and a precursor event. The pre-determined phrases may include, but are not limited to, legal disclaimers, corporate mandated disclosures, marketing and advertising sales pitches, slogans, and anecdotes. The event may be a product or a service sales transaction, a product or a service upgrade or downgrade transaction, a monitored call duration, a specific date of a call, receipt of an incoming call from a particular geographical location, a call from a particular product, or an outstanding account balance. The event may include one or more of the above-mentioned events. The precursor event may be an offer for sale, an offer for upgrade, a request for feedback, a response to a request to speak with a manager, and a response to a request for privileged or private information. The precursor event may include one or more of the above-mentioned precursor events. The pre-determined phrase database 260 may also be customizable to fit the needs of the user. That is, the user, such as a manager of a customer service call center, may select an event and a precursor event to be monitored by the system 200, and the system 200 will populate the pre-determined phrase database 260 with the pre-determined phrases associated with the event and the precursor event.

The inventors note that the above listings of account data examples, pre-determined phrases examples, event examples and precursor event examples are merely provided for purposes of enhancing understanding of the present disclosure, and should not be considered as limiting. Those having ordinary skill in the art would readily understand that these listings may be extended. Further, those having ordinary skill would readily recognize that other examples of account data, pre-determined phrases, events and precursor events may be substituted for the ones disclosed or added to the non-exclusive listings provided in the present disclosure.

The system 200 further includes a pre-determined phrase selector 270, a comparator 280, and an outputter 290. The pre-determined phrase selector 270 communicates with at least one of the transcriber 240 and the account data processor 250 to determine whether the event or the precursor event has occurred. The pre-determined phrase selector 270 also communicates with the pre-determined phrase database 260 and at least one of the transcriber 240 and the account data processor 250 to select at least one of the plurality of pre-determined phrases from the pre-determined phrase database 260 based on whether the event or the precursor event has occurred.

The comparator 280 communicates with the transcriber 240 and the pre-determined phrase selector 270 to compute a compliance quality score based on a comparison between the transcript and the selected pre-determined phrase(s). More specifically, the comparator 280 is configured to compare word string matches between the transcript from the transcriber 240 and the selected pre-determined phrase(s) from the pre-determined phrase database 260 to compute the compliance quality score based on the determined word string matches between the transcript and the selected pre-determined phrase(s) associated with the occurrence of at least one of the event and the precursor event. In this regard, the comparator 280 may compute the compliance quality score based on a computation of a percentage match between the pre-determined phrase(s) and the transcript. That is, the compliance quality score represents a percentage match indicating whether or not the pre-determined phrases are sufficiently present in the conversation. Accordingly, the system 200 may implement the Levenshtein distance method to compute the compliance quality score; however, the Inventors also contemplate that the comparator 280 may be configured to utilize other known methods for comparing and matching word strings to derive the compliance quality score.

In alternative embodiments, when the transcriber 240 is configured as a recorder that records the audible input and stores the audible input as recorded audio files, the pre-determined phrase database 260 may store pre-determined phrases as audio files, as well. In this regard, the comparator 280 may further be configured to compare the audio files of the recorder and the audio files of the pre-determined phrase database 260 to compute the compliance quality score based on determined speech recognition matches between the audio files of the recorder and the selected audio files of the pre-determined phrase database 260 associated with the occurrence of at least one of the event and the precursor event. It is also contemplated that the comparator may be configured to utilize any known speech recognition methods or techniques to derive the compliance quality score.

The outputter 290 displays the results of the computed compliance quality score. More specifically, the outputter 290 is configured to display at least one of a positive compliance quality score and a negative compliance quality score to determine at least one of regulatory compliance, marketing compliance, public relations compliance, training quality compliance, and corporate mandated compliance of the recipient during the communication.

For example, different business units of the network provider may determine that certain phrases should be recited by a customer service agent during a communication with potential customers or existing customers. Each of these business units, alone or in any combination, may require the manager of the customer service call center to follow their prescribed guidelines. More particularly, assume a marketing department of the network provider has conducted a market study in which it is determined that "flip-phones" are desirable. In an effort to increase sales, the marketing department may require the customer service agents to offer free "flip-phones" to existing customer that extend their contracts. In this regard, the customer service call center may train the customer service agents to offer the "flip-phones" at the beginning of a conversation. Once the customer service agents are trained, the manager of the customer service call center may utilize the system 200 to monitor the customer service agents' compliance with the mandated disclosure passed down from the marketing department. Thus, the system 200 provides the manager a tool in which the manager can automatically check that the customer service agents are complying with their training and the prescribed guidelines set out by one or more of the business units. The system 200 further allows the manager to assess the skill of the customer service agent and improve performance of the customer service agents. That is, the manager may review the scores of the agents to determine, for example, whether more agent training is necessary to ensure compliance with the mandated disclosures, whether the mandated disclosures should be modified for effectiveness, or whether system 200 should be reconfigured to obtain more predictable or accurate results.

Further, the manager may be interested in determining why a customer service agent has obtained a negative compliance quality score, but has a high volume of sales. Based on the outputted score, the manager may able to determine that the reason the score is low is because the particular agent approaches offering and finalizing sales in an alternative manner while still basically conveying all the required information. At that point, the manager can reconfigure the system 200 or may go back to the various business units to suggest alternative acceptable guidelines.

The inventors also note that the above listings of compliance examples are merely provided for purposes of enhancing understanding of the present disclosure, and should not be considered as limiting. Those having ordinary skill in the art would readily understand that these listings may be extended. Further, those having ordinary skill would readily recognize that other examples of compliance may be substituted for the ones disclosed or added to the non-exclusive listing provided in the present disclosure.

As described above, the system 200 may be implemented to automatically check and evaluate customer service agents based on their adherence to prescribed guidelines (i.e., compliance with the prescribed guidelines) and their ability to convey mandated disclosure statements based on an event or a precursor event, during their communication with customers. In this regard, and to facilitate further understanding of the present disclosure, system 200 may be implemented in the following example. A network provider has decided to push a new product, such as a new cellular phone, to existing customers and has further decided to do so through their customer service agents. In this regard, the network provider may require each customer service agent that speaks with an existing customer to offer the new cellular phone at the beginning of a conversation. More particularly, upon receipt of the phone call, the provider may mandate that the customer service agent recite the following script: "Thank you for choosing Provider X, and because you are a valued customer we would like to offer you Product Y at a reduced, valued customer price! This special purchase offer is only available for a limited time only. Would you care to learn more?" To determine whether or not the customer service agents comply with the mandated disclosures, system 200 may be implemented in the communications network 230 to allow the network provider to rate their customer service agents based on their compliance with the mandated disclosures, whether or not an event, a precursor event, or both have occurred.

The system 200 may be configured to determine whether an event, such as a sales transaction, or a precursor event, such as an offer for sale, has occurred. After the conversation is received by the receiver 210 and the account data processor 250 begins collecting account data from the sender, the pre-determined phrase selector 270 monitors the account data processor 250 for the occurrence of the event, such as a notification of the sales transaction. When the pre-determined phrase selector 270 determines that the sales transaction has occurred, the pre-determined phrase selector 270 communicates with the pre-determined phrase database 260 to select at least one pre-determined phrase associated with the sales transaction. The comparator 280 then communicates with the transcriber 240 and the pre-determined phrase selector 270 to compute the compliance quality score. That is, the comparator 280 compares the pre-determined phrase(s), associated with the sales transaction, with the transcript of the conversation between the customer and the customer service agent to compute a score based on the customer service agent's compliance with the mandated disclosures regarding sales transactions.

When the event has not occurred, the pre-determined phrase selector 270 determines whether the precursor event, or the offer for sale, has occurred. Determination that the sales transaction has not occurred may be based on, for example, no monitored change in the account data processor 250 when the conversation is complete, or simply, no change in the account data processor 250 occurs after a pre-determined amount of time during the communication. After it has been determined that the sales transaction has not occurred, the pre-determined phrase selector 270 communicates with the transcriber 240 to identify a trigger phrase in the transcript associated with the offer for sale. The trigger phrase may come from the pre-determined phrase database 260, or alternatively the trigger phrase may come from a separate trigger phrase database (not shown) provided at the pre-determined phrase selector 270 or at the transcriber 240. The trigger phrase may be set at the time system 200 is configured for operation, or the trigger phrase may be set during operation of system 200. For example, the trigger phrase may be a word such as "'buy," or "purchase," or "product Y." In this regard, identification of the trigger phrase in the transcript alerts the pre-determined phrase selector 270 that pre-determined phrases associated with the offer for sale may be present in the transcript.

When the pre-determined phrase selector 270 determines that the trigger phrase associated with the precursor event is present in the transcript, the pre-determined phrase selector 270 communicates with the pre-determined phrase database 260 to select at least one of the pre-determined phrases associated with the offer for sale. As discussed above, the comparator 280 then communicates with the transcriber 240 and the pre-determined phrase selector 270 to compute the compliance quality score.

Accordingly, when the pre-determined phrase selector 270 determines the sales transaction has not occurred after a pre-determined amount of time has elapsed during the communication, the pre-determined phrase selector 270 determines whether the trigger phrase associated with the offer for sale is present in the transcript. In the instant example, if the customer service agent generally adheres to reciting the mandated disclosures, that is, if the customer service agent basically sticks to the mandated script, the pre-determined phrases selector 270 will identify that the trigger phrases, "purchase" and "product Y" are present in the transcript. In this regard, the pre-determined phrase selector 270 then communicates with the pre-determined phrase database 260 to select the pre-determined phrase(s) associated with the offer for sale. Accordingly, customer service agents may be rated based on their adherence to the mandated disclosures, that is, the customer service agents may be rated based on their adherence to offering "product Y" regardless of whether or not the customer service agent completes the sale. Thus, even if a sale transaction has not occurred, the customer service agent can still be rated based upon his/her compliance with the prescribed guidelines as set out by the network provider when an existing customer calls the customer service call center.

More particularly, the customer service agent may be given a positive compliance quality score if he/she adheres to the prescribed guidelines and recites the mandated disclosures when making the offer for sale of "product Y" during the communication with the customer. The customer service agent may be given a negative compliance quality score if he/she fails to sufficiently recite the mandated disclosures when making the offer for sale of "product Y." The outputter 290 will display results of the computations on, for example, a monitor or print-out, and a user can automatically make a determination about whether or not the customer service agent is in compliance with one or more of the above-identified compliance examples.

In a situation where the event has not occurred, and the trigger phrase is not identified in the transcript, the comparator 280 does not compute a compliance quality score. Rather, the pre-determined phrase selector 270 may be further configured to continuously monitor the account data processor 250 for the sales transaction to occur and scan the continuously updated transcript for identification of the trigger phrase as the communication continues. If no event has occurred and no trigger phrase is identified at the conclusion of the communication, no compliance quality score is indicated; however, the manager of the system 200 may be alerted of the "non-score" so that the manager may review the transcript of the communication to see if the customer service agent failed to comply with the mandated disclosures requirement or if the communication did not require any mandated disclosures.

If the system 200 were set up to determine whether an offer for sale and a sale were made according to the mandated disclosures, as in the instant example, and the customer service agent receives a "non-score," the manager may review the transcript and determine the substance of the communication. If the communication relates to the customer merely inquiring about account settings for on-line billing, for example, then the user can determine that the customer service agent is still in compliance with the network provider's prescribed guidelines even though he/she received the "non-score."

In view of the above, the present disclosure enables, for example, managers to more effectively use speech transcription technology to automatically detect whether mandated disclosure statements are made by customer service agents in a communication with a customer within a communications network. This allows managers to more efficiently determine compliance quality of the agents within the communications network and ultimately improve the products and services provided by the communications network.

Figure 3:
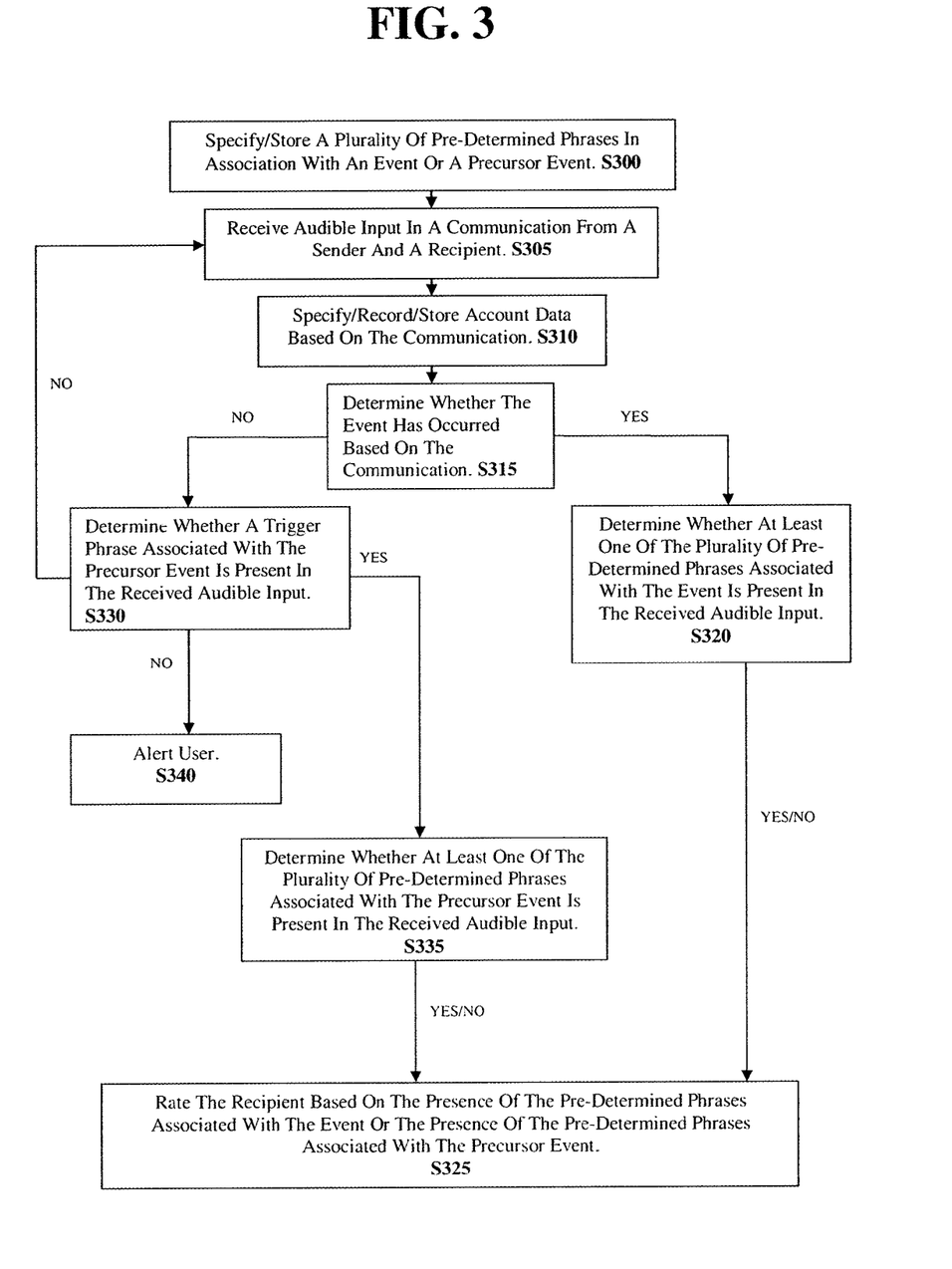
FIG. 3 is a flowchart depicting an exemplary method of detecting pre-determined phrases to determine compliance quality, according to an aspect of the present disclosure.

FIG. 3 is a flowchart depicting an exemplary method of detecting pre-determined phrases to determine compliance quality, according to an aspect of the present disclosure.

System 200 may perform the method as shown in FIGS. 3-9. More specifically, in S300 the method includes specifying and storing a plurality of pre-determined phrases in association with an event and a precursor event in the system 200. These methods may be performed by the pre-determined phrase database 260. In S305 audible input from at least a sender and a recipient in a communication over a communications network is received in system 200. This method may be performed by the receiver 210. The received audible input may also be transcribed into a transcript, or recorded and stored as one or more audio files, in S305. These methods may be performed by the transcriber 240, alone or in combination with the recorder, as discussed above. In S310 account data from the sender based on the communication is specified, recorded and stored in the system 200. These methods may be performed by the account data processor 250.

The method of detecting pre-determined phrases to determine compliance quality continues with S315, in which the system 200 determines whether the event has occurred based on the communication. As discussed above, this method can be performed by the pre-determined phrase selector 270, and the event may be based on a change in the account data of the account data processor 250 being monitored by the pre-determined phrase selector 270. In S320, when it is determined that the event has occurred, the method includes determining whether at least one of the plurality of pre-determined phrases associated with the event is present in the received audible input. Here, the pre-determined phrase selector 270 communicates with the account data processor 250 and the pre-determined phrase database 260.

Figure 4:
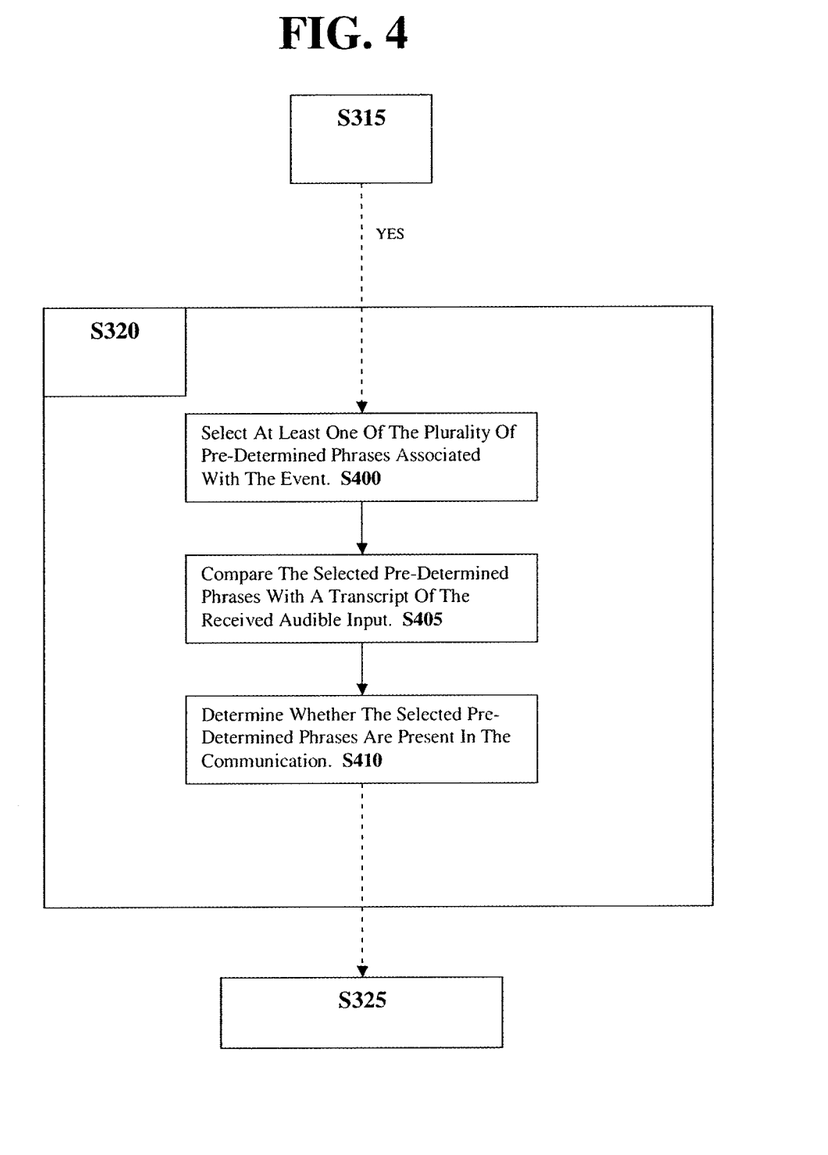
FIG. 4 is a flowchart depicting the exemplary method of FIG. 3, according to another aspect of to the present disclosure.

FIG. 4 shows an expanded view of S320 and determining whether at least one of the plurality of pre-determined phrases associated with the event is present in the received audible input. More specifically, the method of S320 further includes selecting at least one of the plurality of pre-determined phrases associated with the event (S400), comparing the selected pre-determined phrases with a transcript of the received audible input (S405), and determining whether the selected pre-determined phrases are present in the transcript (S410). Here, the pre-determined phrase selector 270 communicates with the pre-determined phrase database 260 to select the phrase(s) associated with the event (S400). The pre-determined phrase selector 270 communicates the selected pre-determined phrase(s) to the comparator 280, and the comparator 280 compares the pre-determined phrase(s) with the transcript from the transcriber 240 to determine whether the selected pre-determined phrases are present in the communication.

Figure 5:
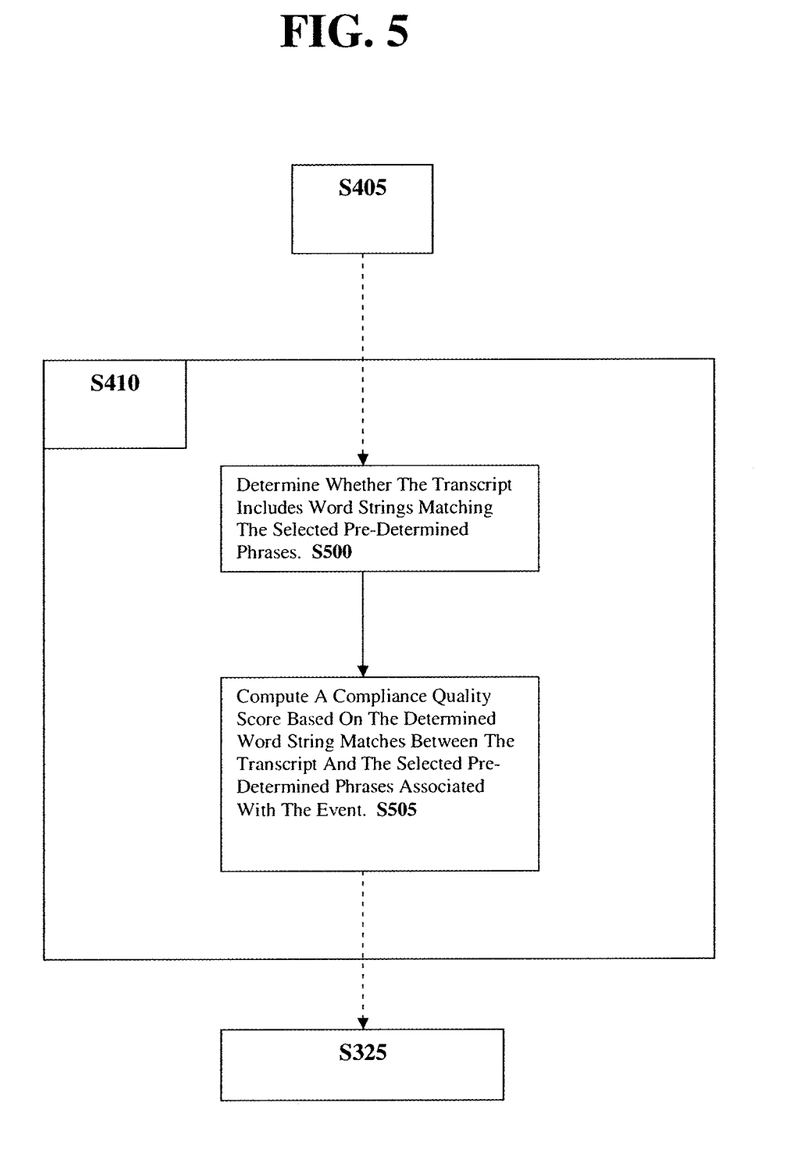
FIG. 5 is a flowchart depicting the exemplary method of FIG. 4, according to yet another aspect of to the present disclosure.

FIG. 5 shows an expanded view of S410 and determining whether the selected pre-determined phrases are present in the communication when the event has occurred. More specifically, in S410 the method determines whether the transcript includes word strings matching the selected pre-determined phrases (S500), and computes a compliance quality score based on the determined word string matches between the transcript and the selected pre-determined phrases associated with the event (S505).

Figure 6:
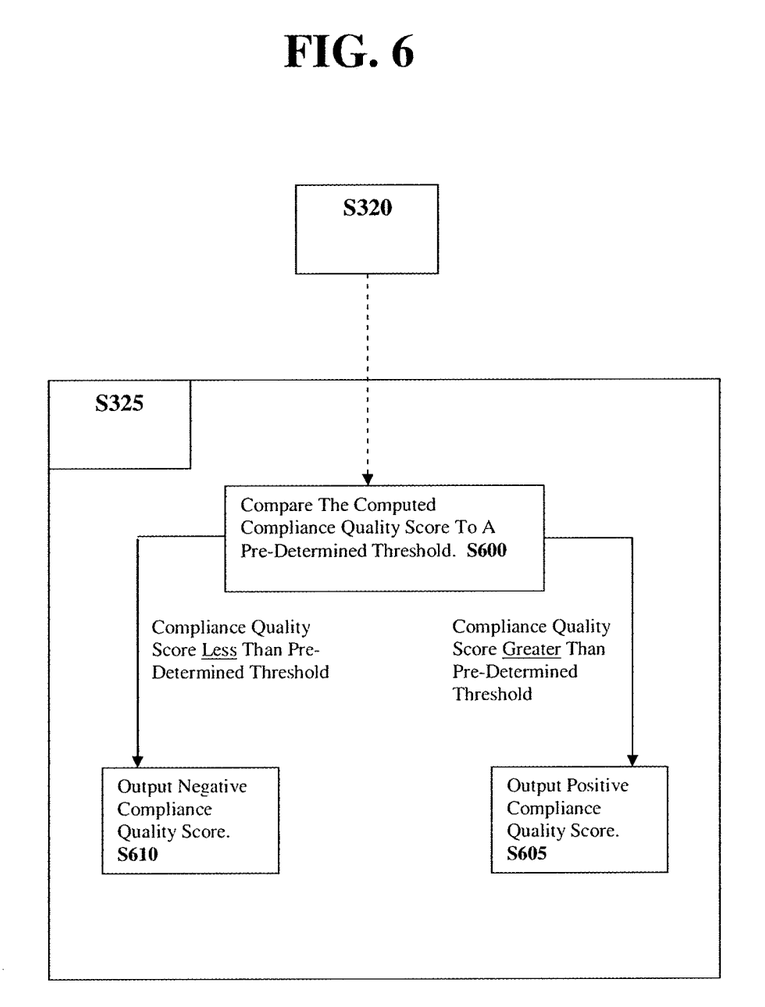
FIG. 6 is a flowchart depicting the exemplary method of FIG. 3, according to still another aspect of to the present disclosure.

FIG. 6 shows an expanded view of S325 and rating the recipient when the event has occurred. More specifically, when the compliance quality score is computed by the comparator 280 in S320, the comparator 280 then compares the computed compliance quality score to a pre-determined threshold in S600. When the computed compliance quality score exceeds the pre-determined threshold, the method outputs a positive compliance quality score in S605. However, when the computed score fails to meet the pre-determined threshold, the method outputs a negative compliance quality score in S610. The method of outputting the compliance quality scores can be performed by the outputter 290.

In S330, when it is determined that the event has not occurred, the method includes determining whether a trigger phrase associated with the precursor event is present in the received audible input. Here, the pre-determined phrase selector 270 communicates with the transcriber 240 and scans the transcript for the trigger phrase. It is also contemplated that the pre-determined phrase selector 270 may also communicate with the pre-determined phrase database 260 or a separate trigger phrase database for the selection of the trigger phrase to be identified in the transcript, as discussed above.

Figure 7:
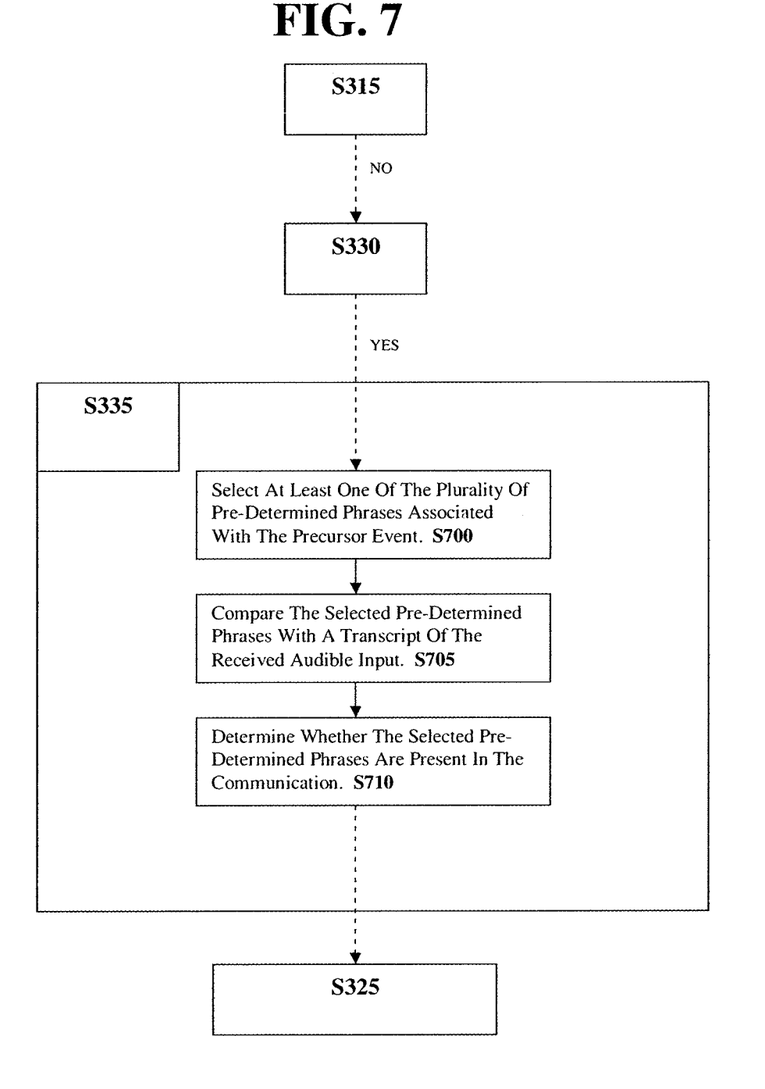
FIG. 7 is a flowchart depicting the exemplary method of FIG. 3, according to an aspect of to the present disclosure.

When the trigger phrase associated with the precursor event is present in the transcript, the method determines, in S335, whether at least one of the plurality of pre-determined phrases associated with the precursor event is present in the received audible input. FIG. 7 shows an expanded view of S335 and determining whether at least one of the plurality of pre-determined phrases associated with the precursor event is present in the received audible input. More specifically, the method of S335 further includes selecting at least one of the plurality of pre-determined phrases associated with the precursor event (S700), comparing the selected pre-determined phrases with a transcript of the received audible input (S705), and determining whether the selected pre-determined phrases are present in the transcript (S710). Here, the pre-determined phrase selector 270 communicates with the pre-determined phrase database 260 to select the phrase(s) associated with the precursor event (S700). The pre-determined phrase selector 270 communicates the selected pre-determined phrase(s) to the comparator 280, and the comparator 280 compares the pre-determined phrase(s) with the transcript from the transcriber 240 to determine whether the selected pre-determined phrases are present in the communication.

Figure 8:
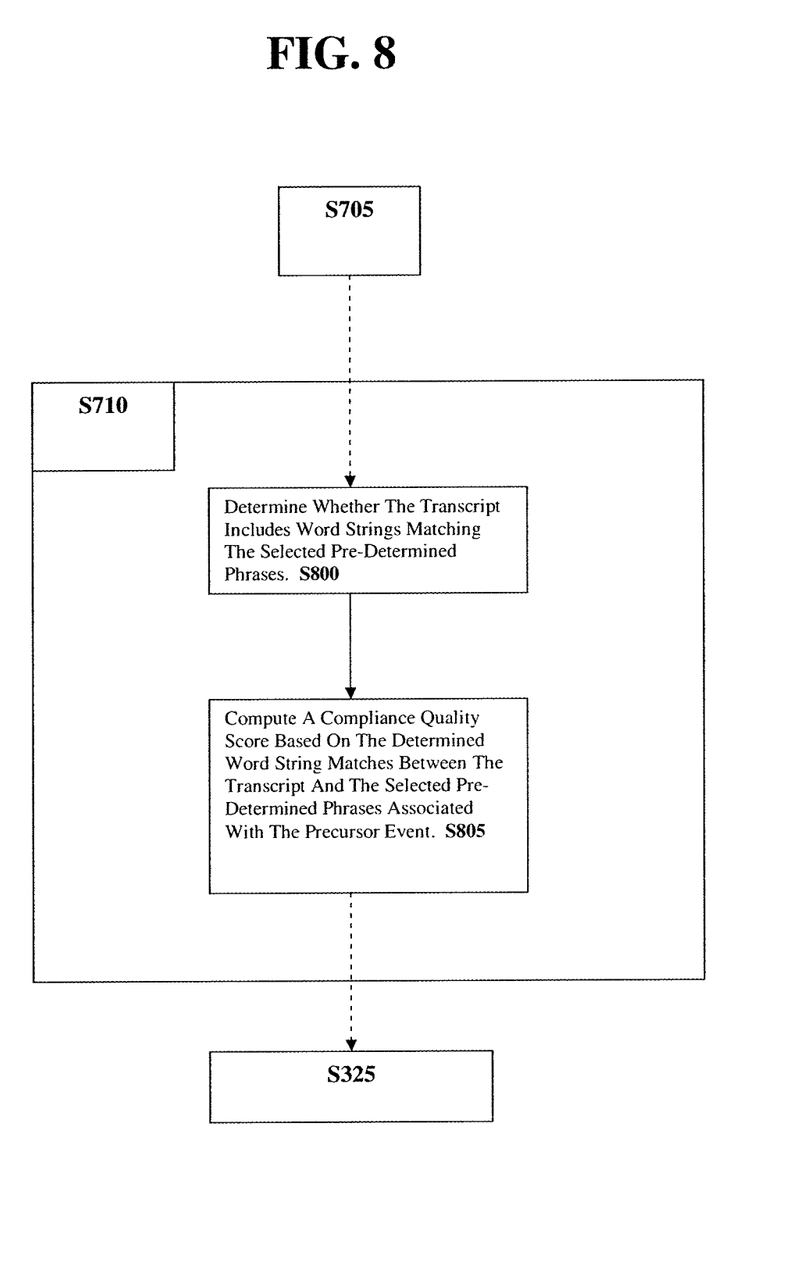
FIG. 8 is a flowchart depicting the exemplary method of FIG. 7, according to another aspect of to the present disclosure.

FIG. 8 shows an expanded view of S710 and determining whether the selected pre-determined phrases are present in the communication when the precursor event has occurred. More specifically, in S710 the method determines whether the transcript includes word strings matching the selected pre-determined phrases (S800), and computes a compliance quality score based on the determined word string matches between the transcript and the selected pre-determined phrases associated with the precursor event (S805).

Figure 9:
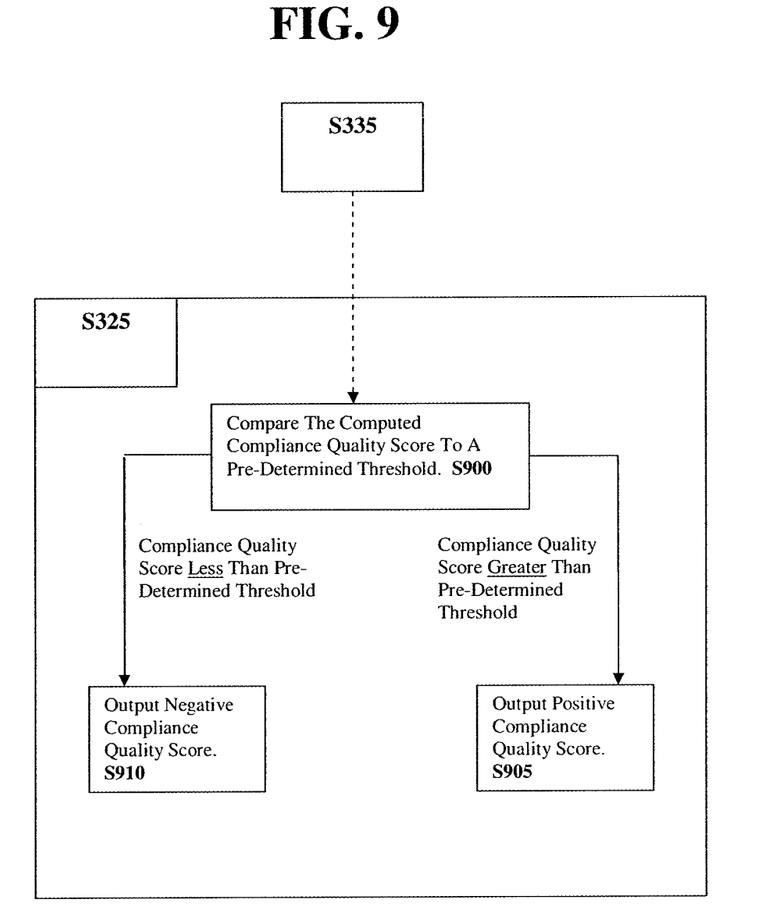
FIG. 9 is a flowchart depicting the exemplary method of FIG. 3, according to yet another aspect of to the present disclosure.

FIG. 9 shows an expanded view of S325 and rating the recipient when the precursor event has occurred. More specifically, when the compliance quality score is computed by the comparator 280 in S325, the comparator 280 then compares the computed compliance quality score to a pre-determined threshold in S900. When the computed compliance quality score exceeds the pre-determined threshold, the method outputs a positive compliance quality score in S905. However, when the computed score fails to meet the pre-determined threshold, the method outputs a negative compliance quality score in S910. The method of outputting the compliance quality scores can be performed by the outputter 290. A positive compliance quality score may be indicative of a customer service agent's ability to convey the mandated disclosures in a compliant manner. A negative compliance quality score may be indicative of the customer service agent's inability to convey the mandated disclosures in a compliant manner.

When it is determined that the event has not occurred and the trigger phrase has not been identified, the comparator 280 does not compute a compliance quality score, as noted in S330. Rather, as shown in S340, the method includes alerting a user of the system 200 that a "non-score" has been determined when the communication is complete. Alternatively, when no event has occurred and no trigger phrase has been identified in S330, and the communication is ongoing, the method is recycled to S305. That is, the communication continues to be monitored until an event or a precursor event occurs. In other words, the pre-determined phrase selector 270 continues monitoring the account data processor 250 for an event to occur or for the trigger phrase to be identified in the continuously updated transcript.

In S325, the method also includes displaying the outputted compliance quality score to determine at least one of regulatory compliance, marketing compliance, public relations compliance, training quality compliance, and corporate mandated compliance of the recipient during the communication. It is further contemplated that S325 may include collecting a plurality of outputted compliance quality scores from a plurality of received communications including the recipient; and averaging the collected plurality of outputted compliance scores to identify compliance quality of the recipient for improving compliance quality within the communications network. By averaging a plurality of scores based on a plurality of conversations held by the agent, the manager may be able to more accurately rate the agents compliance quality.

While the system 200 has been described in a customer service setting, application of the system 200 may extended to other settings, such as training and monitoring compliance quality of, for example, emergency responders, air traffic controllers, or any other profession that requires their agents to respond in a certain manner to a certain situation in a communication.

While the computer-readable medium is shown to be a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present specification describes components and functions that may be implemented in particular embodiments with reference to particular standards and protocols, the disclosure is not limited to such standards and protocols. For example, standards for Internet and other packet switched network transmissions represent examples of the state of the art. Such standards are periodically superseded by faster or more efficient equivalents having essentially the same functions. In this regard, the present disclosure may be applied to communications made over public switched telephone networks, wireless networks, or the internet. Accordingly, replacement standards and protocols having the same or similar functions are considered equivalents thereof.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is provided to comply with 37 C.F.R. §1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method of detecting pre-determined phrases to determine compliance quality, comprising:
specifying a plurality of pre-determined phrases in association with an event and a precursor event;
receiving audible input from a sender and a recipient in a communication over a communications network;
determining by a processor whether the event has occurred based on the communication;
if the event has not occurred, determining whether a trigger phrase associated with the precursor event is present in the audible input received;
if the trigger phrase associated with the precursor event is present, determining whether a pre-determined phrase of the plurality of pre-determined phrases associated with the precursor event is present in the-audible input received; and
rating the recipient based on a presence of the pre-determined phrase associated with the precursor event in the communication.

2. The method of claim 1, further comprising:
if the event has occurred, determining whether a pre-determined phrase of the plurality of pre-determined phrases associated with the event is present in the audible input received by selecting a pre-determined phrase of the plurality of pre-determined phrases associated with the event, comparing the pre-determined phrase selected with a transcript of the audible input received, and determining whether the pre-determined phrase selected is present in the transcript.

3. The method of claim 1,
wherein the determining whether a pre-determined phrase of the plurality of pre-determined phrases associated with the precursor event is present in the audible input received comprises:
selecting a phrase of the plurality of pre-determined phrases associated with the precursor event;
comparing the pre-determined phrase selected with a transcript of the received audible input; and
determining whether the pre-determined phrase selected is present in the transcript.

4. The method of claim 2, further comprising:
determining whether the transcript includes a word string matching the pre-determined phrase selected, and computing a compliance quality score based on determining that the transcript includes the word string matching the pre-determined phrase selected.

5. The method of claim 3, further comprising:
determining whether the transcript includes a word string matching the pre-determined phrase selected, and computing a compliance quality score based on determining that the transcript includes the word string matching the pre-determined phrase selected.

6. The method of claim 4, wherein the rating the recipient comprises: comparing the compliance quality score computed to a pre-determined threshold and, if the compliance quality score computed exceeds the pre-determined threshold, outputting a positive compliance quality score and, if the compliance quality score computed fails to meet the pre-determined threshold, outputting a negative compliance quality score.

7. The method of claim 5, wherein the rating the recipient comprises: comparing the compliance quality score computed to a pre-determined threshold and, if the compliance quality score computed exceeds the pre-determined threshold, outputting a positive compliance quality score and, if the compliance quality score computed fails to meet the pre-determined threshold, outputting a negative compliance quality score.

8. The method of claim 6, further comprising:
displaying the compliance quality score outputted to determine at least one of regulatory compliance, marketing compliance, public relations compliance, training quality compliance, and corporate mandated compliance of the recipient during the communication.

9. The method of claim 7, further comprising:
displaying the compliance quality score outputted to determine one of regulatory compliance, marketing compliance, public relations compliance, training quality compliance, and corporate mandated compliance of the recipient during the communication.

10. The method of claim 6, further comprising:
collecting a plurality of outputted compliance quality scores from a plurality of received communications involving the recipient; and
averaging the plurality of outputted compliance scores collected to identify compliance quality of the recipient for improving compliance quality within the communications network.

11. The method of claim 7, further comprising:
collecting a plurality of outputted compliance quality scores from a plurality of received communications involving the recipient; and
averaging the plurality of outputted compliance scores collected to identify compliance quality of the recipient for improving compliance quality within the communications network.

12. The method of claim 1, wherein the event is a sales transaction, and the precursor event is an offer for sale.

13. The method of claim 1, further comprising:
specifying account data from the sender based on the communication,
wherein the account data includes information about one of a time, a date, an area code, a call duration, a geographic location, a network designation, an agent, a product, a sales transaction, and an account balance.

14. A system to detect pre-determined phrases for determining compliance quality, the system comprising:
a memory that stores a computer program of executable instructions;
a processor that executes the computer program of executable instructions;
a receiver that receives audible input from a sender and a recipient in a communication over a communications network;
wherein, when executed by the processor, the computer program causes the system to perform operations comprising:
transcribing the audible input into a transcript;
storing a plurality of pre-determined phrases associated with an event and a precursor event;
selecting a pre-determined phrase of the plurality of pre-determined phrases stored;
computing a compliance quality score based on the transcript and the pre-determined phrase selected; and
displaying results of the compliance quality score computed.

15. The system of claim 14, wherein, when executed by the processor, the computer program further causes the system to perform operations comprising:

determining whether the event and the precursor event have occurred;

if the event has occurred, selecting a pre-determined phrase of the plurality of pre-determined phrases associated with the event;

if the event has not occurred and the precursor event has occurred, identifying a trigger phrase associated with the precursor event and, if the trigger phrase associated with the precursor event is present in the transcript, selecting a pre-determined phrase of the pre-determined phrases associated with the precursor event.

16. The system of claim 15, wherein, when executed by the processor, the computer program further causes the system to perform operations comprising:

comparing word string matches between the transcript and the pre-determined phrase selected, and computing the compliance quality score based on the word string matches between the transcript and the pre-determined phrase selected.

17. The system of claim 16, wherein, when executed by the processor, the computer program further causes the system to perform operations comprising:

displaying one of a positive compliance quality score and a negative compliance quality score to determine one of regulatory compliance, marketing compliance, public relations compliance, training quality compliance, and corporate mandated compliance of the recipient during the communication.

18. A non-transitory computer readable storage medium comprising a computer program that, when executed by a processor, cause the processor to perform operations comprising:

receiving audible input from a communication between a sender and a recipient in a communications network and transcribing the audible input into a transcript;

receiving a plurality of pre-determined phrases associated with an event and a precursor event;

selecting a pre-determined phrase of the plurality of pre-determined phrases based on the transcript;

computing a compliance quality score based on a word string match between the pre-determined phrase selected and the transcript; and an output code segment, recorded on the tangible computer readable storage medium, executable to display results of the compliance quality score computed.

19. The non-transitory computer readable storage medium of claim 18, wherein the computer program, when executed by the processor, further causes the processor to perform operations comprising:

determining whether the event and the precursor event have occurred;

if the event has occurred, selecting a pre-determined phrase of the plurality of pre-determined phrases associated with the event; and if the event has not occurred and the precursor event has occurred, identifying a trigger phrase associated with the precursor event from the transcript, and if the trigger phrase associated with the precursor event is present in the transcript, selecting a pre-determined phrase of the pre-determined phrases associated with the precursor event.

20. The non-transitory computer readable storage medium of claim 19, wherein the computer program, when executed by the processor, further causes the processor to perform operations comprising:

comparing the word string match between the transcript and the pre-determined phrase selected of the plurality of pre-determined phrases and computing the compliance quality score based on the word string match determined between the transcript and the pre-determined phrase selected.

* * * * *